March 2, 1926.
R. C. SEYMOUR
POWER TRANSMITTING MECHANISM
Filed June 17, 1924
1,575,360
3 Sheets-Sheet 1
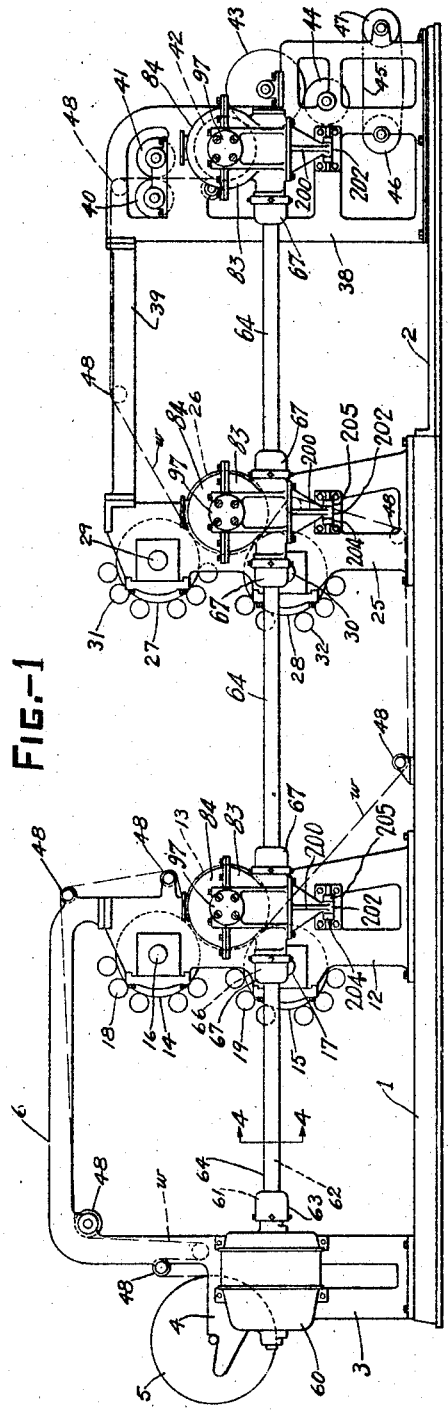
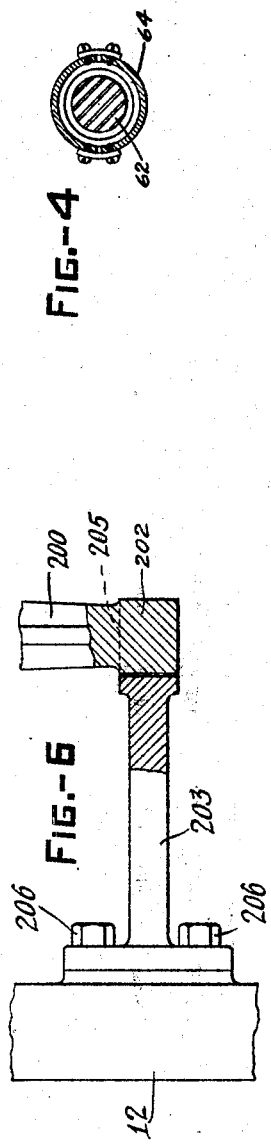
INVENTOR
R. C. Seymour
BY
John D. Morgan
ATTORNEY March 2, 1926.
R. C. SEYMOUR
POWER TRANSMITTING MECHANISM
Filed June 17, 1924
1,575,360
3 Sheets-Sheet 2
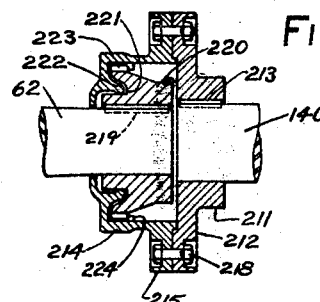
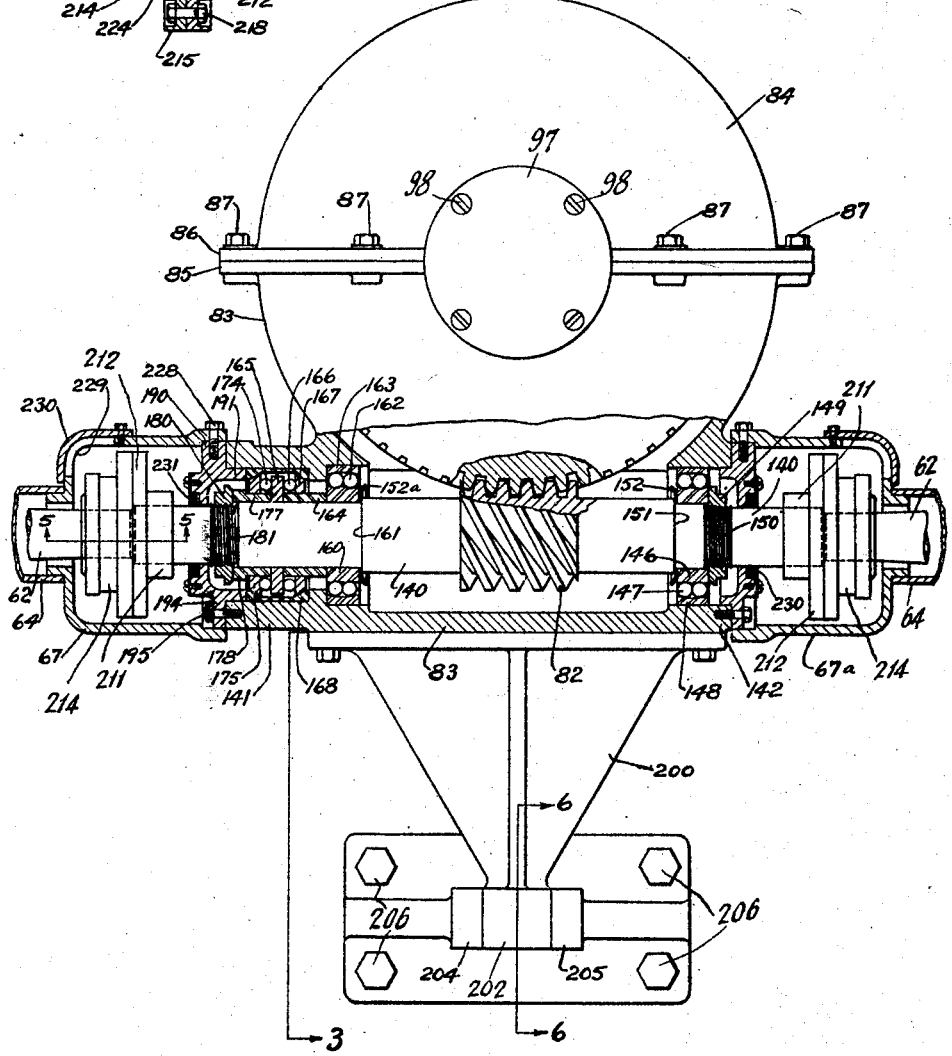
INVENTOR
R.C. Seymour
BY
John D. Morgan
ATTORNEY

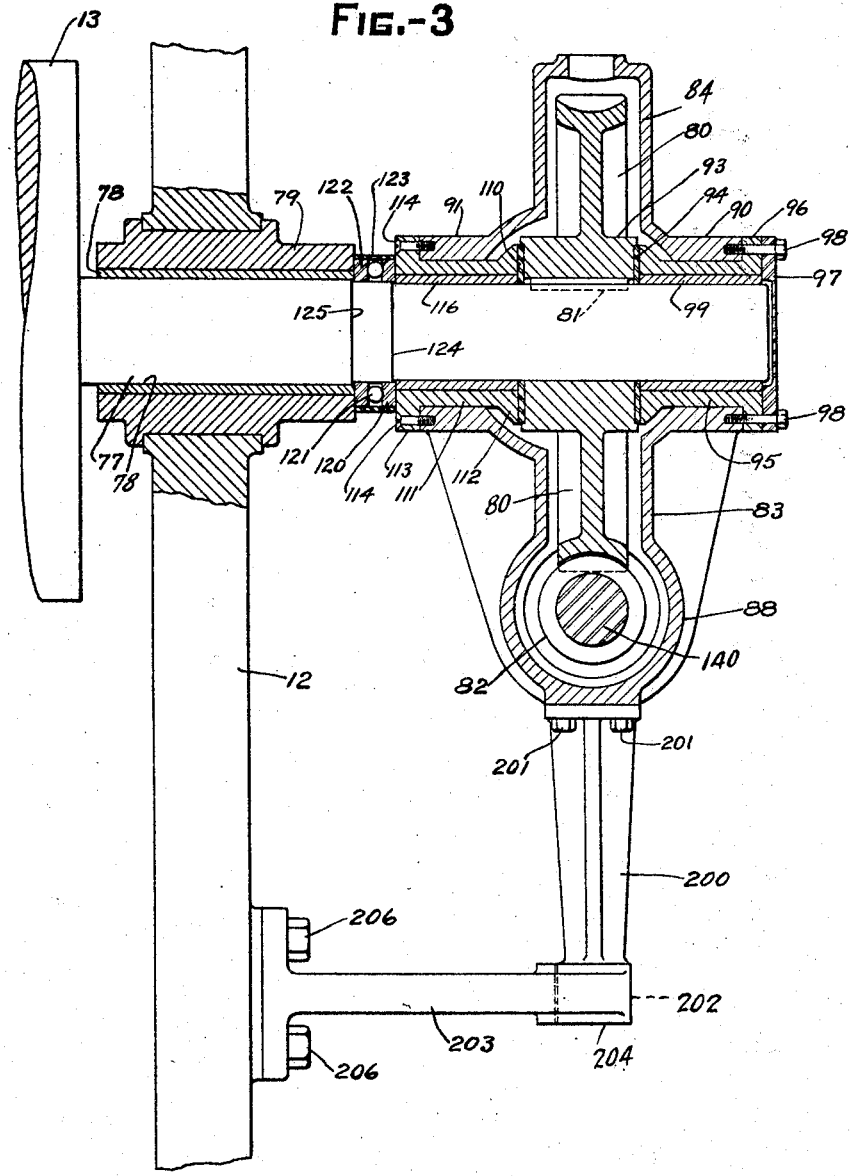

Patented Mar. 2, 1926.

1,575,360

UNITED STATES PATENT OFFICE.

RALPH C. SEYMOUR, OF SHORT HILLS, NEW JERSEY.

POWER-TRANSMITTING MECHANISM.

Application filed June 17, 1924. Serial No. 720,484.

*To all whom it may concern:*

Be it known that I, RALPH C. SEYMOUR, a citizen of the United States, residing at Short Hills, in the county of Essex and State of New Jersey, have made a certain new and useful Improvement in Power-Transmitting Mechanism, of which the following is a specification.

The invention relates to novel power transmitting mechanism, which in certain aspects thereof is especially adaptable to drive a plurality of units and also to direct electric motor drives.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation showing the invention applied to a multi-unit printing press and folder;

Fig. 2 is an enlarged elevation, with parts in section and parts broken away, of an embodiment of the driving mechanism;

Fig. 3 is a vertical, transverse section on line 3—3 of Fig. 2;

Fig. 4 is a detail section on line 4—4 of Fig. 1;

Fig. 5 is a detail section on line 5—5 of Fig. 2; and

Fig. 6 is a fragmentary section on line 6—6 of Fig. 2.

The invention is directed to power transmitting mechanism which is self-alining or rather, which requires no exact alining; between the motor and the driven mechanism; or between groups of driven mechanisms, as it is especially adapted to transmit power from a motor to a plurality of groups of driven mechanisms. Such a power transmitting mechanism is also unaffected by any incidental changes in alinement between the various groups of mechanisms, as are likely to occur after installation and under ordinary working conditions.

The invention is further directed to providing a power transmitting mechanism whereby a high speed motor may be directly connected to the driven mechanism, or groups of mechanisms, the power transmitting mechanism being of exceeding simple form. There is, thereby effected great economy in cost of motor and mechanism, together with great simplification of the latter. Other features and objects of the invention will be set forth in connection with the appended detailed description.

The invention as exemplarily embodied, is shown applied to a perfecting rotary printing press and folder, wherein there are two groups of printing cylinders, carried in suitable frame structures, disposed at different locations along a general frame or bedplate, with the folding mechanism similarly mounted at one end of the bedplate. Each separate group of printing mechanism comprises an impression cylinder with two cooperating form cylinders and their respective inking mechanisms, for printing in two colors on one side of the web.

A high speed motor is supported directly on the press frame and the motor shaft is connected by a flexible coupling to a section of shaft, which section at its other end is connected by a flexible coupling to a gear mechanism in fixed relation to, and driving directly on the shaft of the impression cylinder.

A flexible coupling on the other side of the gear mechanism connects with a shaft, which at its opposite end connects by a flexible coupling with the gear mechanism in fixed relation to the shaft of the impression cylinder of the other group of printing cylinders. A like connection extends from this gear mechanism to a gear mechanism which drives the rotary folding mechanism.

Each of the gear mechanisms referred to is in fixed relation to its driven shaft, but has free, self-acting adjustive relation with the remainder of the machine, or groups of mechanism, including the machine frame. Thus it is always certainly and exactly alined with its driven shaft, and its alinement or lack of alinement with the rest of the machine is immaterial; so that, with relation thereto it may be said to be freely adjustive.

It will be understood that so far as concerns the invention in its broader aspects the groups of printing cylinders and the folding mechanism are merely typical generally of practically any groups of driven mechanisms, the continued maintenance of which in exact and permanent alinement is a matter of difficulty, as is well known.

Referring preliminarily to the main features of the invention as herewith exemplarily embodied, the preferably high speed motor is mounted directly and in permanent position on the machine frame, and is connected by a flexible coupling, comprising a shearing pin or equivalent device, to a shaft section, preferably inclosed in a safety or protecting cover. At its opposite end the shaft has a flexible connection with the gear drive for the first group of mechanism.

This gear drive comprises a worm wheel fixed on a driven shaft, and meshing therewith a worm, journaled in bearings in a frame which is supported on the driven shaft, and preferably hung therefrom. This frame is preferably a housing adapted to hold a lubricant in which the gears are immersed to a greater or less degree.

Carried also by the frame or housing is a thrust bearing for the worm shaft, acting in the usual manner. The housing has also a loose connection with the frame whereby the worm is held from angular motion relatively to its shaft, but is free to move in any other direction relatively to the frame, while maintained always in fixed relation relatively to its shaft. Thus it has the previously mentioned free adjustive relation relatively to the frame, and freedom from being harmfully affected by any positional changes thereof.

It will be understood that the foregoing general description and the following detailed description, as well, are exemplary and explanatory of the invention, but are not restrictive thereof.

Referring now in detail to the embodiment of the invention, illustrated by way of example in the accompanying drawings, it is shown applied to a printing press and folder, although it will be understood that the invention is likewise and equally applicable to other kinds or types of machines. The printing press (Fig. 1) is shown with a general frame or bed plate 1, with a like frame or bed plate 2 extending from the end thereof, upon which the folding mechanism is mounted. Mounted at one end and at either side of the bed plate 1 is a pair of upwardly-extending side frames 3, provided with brackets 4 upon which the web supply roll 5 is mounted. The side frames 3 at their upper ends have forwardly-disposed extensions 6, which are fastened to the next pair of side frames, 12, which carry the first printing mechanism.

This pair of side frames 12 are likewise mounted upon, and extend upwardly from, the base 1. The printing mechanism comprises an impression cylinder 13, journaled in the frames, and cooperating therewith are two form cylinders 14 and 15, journaled respectively at 16 and 17 in the side frames 12. Form cylinder 14 has suitable inking mechanism, indicated diagrammatically at 18, and form cylinder 15 has inking mechanism likewise indicated diagrammatically at 19.

The second printing mechanism comprises side frames 25, fixed to the bed plate 1 and extending upwardly therefrom. The mechanism comprises an impression cylinder 26, journaled in the side frames, and cooperating therewith are two form cylinders 27 and 28, which are journaled, respectively, at 29 and 30 in the side frames 25. Form cylinder 27 has suitable inking mechanism, indicated diagrammatically at 31, and from cylinder 28 has also suitable inking mechanism, indicated diagrammatically at 32. It will be understood that the features of the two groups of printing mechanisms are indicated in a general or conventional way so far as concerns the features thereof not relating directly to the invention, and many features of the press are omitted from the drawings and description for the same reason.

The folding mechanism (Fig. 1) comprises side frames 38, mounted upon the base plate 2 and extending upwardly therefrom. A pair of horizontally-disposed frame members 39 are shown connected between the top ends of the side frames 25 and side frames 38. The folding mechanism, like the printing mechanism, is shown only in its general features and more or less conventionally in so far as the structure thereof does not relate to the present invention.

A pair of rotary cutting cylinders 40 and 41 cut the web $w$ into sheets, and the sheets are collected upon a collecting cylinder 42, which may be of any desired or suitable form. The collecting cylinder delivers to a folding cylinder 43, which in turn delivers the folded sheets or signatures to a delivery cylinder 44. The folded signatures are delivered to a delivery belt 45, running on rollers 46 and 47. It will be understood, as already indicated, that these parts are largely shown conventionally.

The web $w$ on the supply roll 5 runs over a series of guiding rollers 48, and is printed in two colors on one side by the first printing mechanism, and is printed in two colors on the opposite side by the second printing mechanism, and is then cut, collected, folded and delivered by the folding mechanism.

Referring now in detail to the present preferred and illustrated embodiment of my invention, a motor 60 (Fig. 1), preferably high speed, is mounted in fixed position on one of the side frames 3, although the motor may be mounted in any suitable position or manner. With my invention, however, an adjustment mechanism for varying the position of the motor relatively to the driving mechanism is not necessary. The motor shaft is directly connected (Figs. 1, 2 and 5) by a flexible connection 61 (later to be fully described) with a shaft, or shaft section 62, the connection being enclosed within a casing 63 and the shaft section within a casing 64. The shaft section at its opposite end is connected by a like flexible connection 66 (later fully described) to the drive for the first printing mechanism, the flexible connection being enclosed within a casing 67.

Referring now in detail (Figs. 2 and 3) to one of the driving and power transmitting mechanisms (which may all be alike, or substantially so), as preferably embodied, the drive is applied to the impression cylinder of each printing mechanism and to the collecting cylinder of the folding mechanism. The other cylinders and rotating parts are driven from these in any suitable manner, as by ordinary spur gearing or otherwise. The present invention is described as applied to impression cylinder 13, and its application elsewhere will be understood therefrom. As so applied, the impression cylinder 13 has a shaft 77, journaled in a sleeve 78 mounted in a bearing 79, which is shouldered to fit, and is supported in one of the side frames 12. Fixed on the shaft 77 is a worm wheel 80, by suitable means such as a key 81, and meshing with the worm wheel 80 is a worm 82, which is journaled in fixed relation with respect to the shaft 77 of the impression cylinder. That is irrespective of any variations in alinement occurring in the frame or elsewhere, the drive will always be in alinement with its shaft, and thus with its cylinder, and by means of the flexible shaft will always be in correct driving relation with the motor.

For this purpose, the worm is journaled in a frame supported by the shaft 77 and in the present instance it is hung therefrom. Furthermore, the supporting frame for the worm is preferably formed as a housing which contains a lubricant for the gearing.

The housing (Figs. 2 and 3) is preferably in two main parts, comprising a bottom portion 83 having a horizontally-disposed bottom portion 88, enclosing the worm and a flat circular portion extending upwardly therefrom and encasing the lower half of the worm wheel. A corresponding or cooperating upper part 84 of the housing encases the upper half of the worm wheel, the two parts 83 and 84 being connected together by abutting flanges 85 and 86, respectively, fastened together by bolts 87. The housing has axially-located and exteriorly-extending hub shaped, or cylindrical portions 90 and 91, respectively, which encircle the shaft 77 at either side of the housing. Each of these hub-like parts of the housing is formed partly on the lower section 83 and partly on the upper section 84 of the housing, but are not necessarily flanged.

In the embodied form of the suspension of the housing from the cylinder shaft, at its exterior side face, the hub 93 (Fig. 3) of the worm wheel abuts on a friction washer 94. This washer in turn abuts on an integral sleeve 95, encircling shaft 77, and having a loose non-rotating friction sleeve 99 between it and the shaft. Sleeve 95 has its inner end enlarged or flanged, with its flat face bearing on washer 94. At its outer end this sleeve 95 has a flange 96, against the inner flat face of which the exterior annular ends of the two halves of the circular part of the housing 90 abut. An end cover plate 97 encloses the end of the housing with the end of the shaft 77 therewithin, the cover plate fitting against the outside face of the flange 96. This entire structure is made unitary by bolts 98 passing through the cover plate, through the flange 96 and into the split hub 90 of the two parts of the housing.

The housing is likewise mounted on the inner side of the worm wheel by a similar structure, which has, however, the additional function of transmitting the thrust of the drive to a thrust bearing and to the side frame 12. A flat friction washer 110 abuts on the inside face of the hub 93 of the worm wheel 80, and an integral cylindrical sleeve 111 (like the sleeve 95) encircles the shaft 77. This sleeve 111 has an interior enlarged or flanged end 112, with the flat face thereof abutting on the friction washer 110. At its outer end, sleeve 111 has an annular flange 113, and screws or bolts 114 pass therethrough and into the end of the split cylindrical portion 91 of the housing, thereby rendering this hub-like encasing structure of the two housing parts 83 and 84 integral or unitary. A loose non-rotating friction sleeve 116 encircles the shaft 77 within the sleeve 111.

The thrust bearing between the housing and frame member 12 comprises a ring 120 encircling the shaft 77 and abutting on the inner end of the sleeve 116, which sleeve it will be recalled, abuts on the friction washer 110, which runs in contact with the hub 93 of the worm wheel 80. The ring 120 constitutes a member of a ball bearing having a series of balls 121, running between the plate 120 and an annular plate 122, which contacts against the annular side face of the shouldered shaft bearing 79, mounted in the side frame 12. Shaft 77 is preferably decreased in diameter at 124 and 125 as shown. The axial thrust from the worm wheel is transmitted to the thrust bearing and thence is absorbed by the frame. The ball race is provided with an external enclosing cylindrical ring 123.

Referring now in detail to the mounting of the worm 82 within the housing (Figs. 2 and 3), the worm is formed or fixed on a worm shaft 140, which is journaled at either end in the extensions 141 and 142 of the lower part 88 of the housing, and as shown the shaft (Fig. 2), is journaled in a pair of ball bearings. At the right hand side in Fig. 2, the shaft is reduced in diameter at 151 and is encircled by a cylindrical ring 146, constituting the inner member of a ball bearing, having balls 147 running also in an outside cylindrical ring 148, which fits within the cylindrical part 142 of the housing member 88. A nut 149 is screwed onto a screw-thread 150, formed on shaft 140, whereby the bearing ring 146 is firmly positioned against the shoulder 151 of the shaft 140. A washer 152 may be provided between the ring 146 and the shoulder 151.

The journal bearing for the worm shaft at the other side comprises a similar ball bearing, and a thrust bearing to take the thrust from the worm is also provided. The ball bearing on this side comprises a cylindrical ring 160, encircling a reduced part 161 of the shaft 140, thereby forming a shoulder against which the ring 160 abuts. The exterior face of the ring 160 provides the inner raceway for the balls 162, running also against the inner face of an exterior cylindrical ring 163. This ring fits within the cylindrical extension 141 of the lower part 88 of the housing.

Encircling loosely the reduced portion of the shaft 140, and with its inner end abutting on the race ring 160, is a sleeve 164, and the exterior end thereof abuts on an annular plate 165, encircling shaft 140, and constituting part of a thrust bearing. A series of balls 166 runs in a raceway on the inner face of the plate 165 and also in a similar manner against the face of an annular plate 167, likewise encircling shaft 140. The exterior periphery of plate 167 is beveled to fit into a correspondingly shaped inner part of a cylindrical carrier ring 168. The exterior periphery of ring 168 fits within the hollow cylindrical part 141 of the housing, already referred to.

On the opposite and outer face of the annular plate 163 is a series of balls 174, running in a raceway thereon, and also running in a raceway on the inner surface of a like flat plate 175, likewise encircling shaft 140.

The periphery of plate 175 is beveled to fit into a correspondingly shaped inner part formed on the outside end of the cylindrical carrier ring 168, already described. A sleeve 177 encircles the shaft 140, with its inner end abutting on the plate 165, and with its outer end provided with a shoulder 178, the inner face of which abuts against the outer face of the carrier ring 168. A nut 180 is screwed onto a screw-thread 181, formed on shaft 140, the nut screwing against the outer face of the shoulder 178, which holds the entire structure just described firmly against the shoulder 161 formed in the shaft 140.

To take up the thrust (Fig. 2), a generally cylindrically shaped member 190 is centrally apertured to loosely encircle shaft 140, and has a cylindrical part 191 extending within the exterior end of the cylindrical part 141 of the housing. This cylindrical part 191 has its inner face abutting against the outer face of the carrier ring 168 of the thrust bearing. Member 190 has an outwardly-extending flanged-like portion 194, which abuts against the annular outer end of the part 140, and is fastened thereto by screw-bolts 195. Thereby the thrust is transferred from the worm and worm shaft to the housing.

Means are provided by the invention (Figs. 2, 3 and 6) for preventing movement of the housing and therewith of the worm either angularly about shaft 77 or axially of the worm shaft. As embodied, an arm 200 is fixed to the bottom part of the housing by suitable means such as tap bolts 201. The lower end 202 of this arm is squared to fit into the correspondingly shaped recess, formed between the outwardly-extending parts 204 and 205 of an arm 203. These ends constitute a snug but movable fit at either side of the end 202 of the arm, but are open at the front, and adequate clearance is provided at the back (Fig. 6). The arm 203 is bolted to the side frame 12 by bolts 206. The arm 200, therefore, is free to move upwardly or downwardly, and also inwardly and outwardly, but is prevented from sidewise movement by the parts 204 and 205, which restraint is in the angular direction about shaft 77 and axially of the worm shaft 140. Thus the driving mechanism is free from any need of adjustment or alinement due to settlings, deformation or other disturbing circumstances likely to develop in extensive mechanism, especially where supported on a long frame and with a plurality of successive mechanisms.

Referring now in detail (Figs. 1, 2 and 5) to the flexible mounting between the various shafts or shaft sections 62 and the respective worm shafts 140, there is adequate clearance provided between the ends of the two shafts. The shaft 140 has fixed thereto a hub 211 by suitable means such as a key 213. Fixed to and extending from the hub is a flange 212. Near its outer edge flange 212 is fastened to a generally bowl-like member 214 encircling and enclosing the end of shaft 62. Member 214 has a flange 215 abutting on and shouldered into the flange 212, bolts 218 fastening the two firmly together. Encircling the end of shaft 62 and fixed thereto by suitable means, such as a key 219, is a hub-like member 220 which is loosely enclosed within the bowl-like member 214, which is fixed on shaft 140.

On its outside face, member 220 has a dished, annular recess 221, into which fits loosely a correspondingly shaped annular projection 222 formed on the inner face of the member 214. On the exterior periphery of the member 220 there is an annular series of external gear teeth 223, which mesh with an annular series of internal gear teeth, formed on the interior annular surface of the member 214. Members 214 and 220 have a close circumferential fit centering shaft 62 with the worm shaft 140, but flexible as to the angle of centers through gears 223 and 224. The rotational motion of shaft 62 is imparted to the shaft 140 by the precedingly-described mechanism, while otherwise the two shafts 62 and 140 are freely movable relatively to each other longitudinally and obliquely to the axes of the shaft, by reason of the structure and clearances as shown in Fig. 5 and as already described.

The casing 67 for the universal or flexible joint described is fixed (Fig. 2) to the exterior periphery of the member 190 by suitable means, such as tap bolts 228, and the casing is preferably provided with an aperture 229, closed by a plate 230, which gives access to the joint for inspection, lubrication and the like.

The two ends of the worm shaft bearing are closed in any suitable manner to prevent escape of the lubricant, as by plates 230 and 231, and an orifice 232 at the top of the housing is provided for supplying the lubricant.

From all the foregoing it will be understood that mechanism has been provided realizing the objects and advantages herein set forth, together with other objects and advantages. It will be apparent, further, that departures may be made from the mechanisms herein exemplarily shown and described without departing from the principles of the invention and without sacrificing its chief advantages.

What I claim is:—

1. A power transmitting mechanism including in combination a driven shaft journaled in a machine frame, a worm wheel fixed on the shaft, a worm meshing with the worm wheel, a worm shaft, a support in which the worm shaft is journaled, the support being mounted loosely on the driven shaft only, means for driving the worm, and means restraining the worm from angular movement about the driven shaft while leaving it continually free for adjustive movement due to wear of the shaft journal bearing, or to non-alinement in the driven machine.

2. A power transmitting mechanism including in combination a driven shaft journaled in a machine frame, a worm wheel fixed on the shaft, a worm meshing with the worm wheel and its shaft, a worm shaft, a housing mounted loosely on the driven shaft only, journal bearings for the worm shaft in the housing, means for restraining the housing from rotational movement about the driven shaft, but continually permitting adjustive movement toward and from the machine frame in the longitudinal direction of the driven shaft.

3. A power transmitting mechanism including in combination a driven shaft journaled in a machine frame, a worm wheel fixed on the shaft, a worm meshing with the worm wheel and its shaft, a worm shaft, a housing suspended loosely from the driven shaft only, journal bearings for the worm shaft in the housing, means for restraining the housing from rotational movement about the driven shaft, but permitting continual adjustive movement relatively to the machine frame, while maintaining the worm in fixed relation to the worm wheel shaft.

4. A power transmitting mechanism including in combination a driven shaft journaled in a machine frame, a worm wheel fixed on the shaft, a worm meshing with the worm wheel and its shaft, a worm shaft, a housing mounted loosely on the driven shaft, journal bearings for the worm shaft in the housing, a thrust bearing for the worm shaft mounted in the housing, means for restraining the housing from rotational movement about the driven shaft, but permitting continual adjustive movement relatively to the machine frame.

5. A machine including in combination a plurality of driven shafts mounted in separate machine frame units, a plurality of worm wheels fixed respectively to the shafts, a housing for each driven shaft supported by the shaft, a worm in driving relation to the worm wheel on the shaft, and journaled in the housing, a thrust bearing for the worm shaft mounted in the housing, and connecting shaft sections connecting the worm shafts, said shaft sections being free to move transversely and longitudinally, and means for continually permitting movement of the worm shafts and their bearings with their driven shafts and relatively to the machine frame, but preventing any movement of the worm shafts angularly about their driven shafts.

6. A machine including in combination a plurality of driven shafts mounted in separate machine frame units, a plurality of worm wheels fixed respectively to the shafts, a housing for each driven shaft supported by the shaft, a worm in driving relation to the worm wheel on the shaft, and journaled in the housing, a thrust bearing for the worm shaft mounted in the housing, and connecting shaft sections connecting the worm shafts, said shaft sections being connected at either end to the worm shafts by flexible unions, whereby the connecting shaft sections are free to move transversely and longitudinally, and means for continually permitting movement of the worm shafts and their bearings with their driven shafts and relatively to the machine frame, but preventing any movement of the worm shafts angularly about their driven shafts.

7. A machine including in combination a plurality of driven shafts mounted in separate machine frame units, a plurality of worm wheels fixed respectively to the shafts, a housing for each driven shaft loosely supported from the shaft only, a worm in driving relation to the worm wheel on the shaft, and journaled in the housing, a thrust bearing for the worm shaft mounted in the housing, and connecting shaft sections connecting the worm shafts, said shaft sections being free to move transversely and longitudinally, and means for continually permitting movement of the worm shafts and their bearings with their driven shafts, and relatively to the machine frame but preventing any movement of the worm shafts angularly about their driven shafts.

8. A machine including in combination a plurality of driven shafts mounted in separate machine frame units, a plurality of worm wheels fixed respectively to the shafts, a housing for each driven shaft loosely supported from the shaft only, a worm in driving relation to the worm wheel on the shaft, and journaled in the housing, a thrust bearing for the worm shaft mounted in the housing, and connecting shaft sections connecting the worm shafts, said shaft sections being connected at either end to the worm shafts by flexible unions, whereby the connecting shaft sections are free to move transversely and longitudinally, and means for continually permitting movement of the worm shafts and their bearings with their driven shafts, and relatively to the machine frame, but preventing any movement of the worm shafts angularly about their driven shafts.

9. A power transmitting mechanism including in combination a driven shaft journaled in a machine frame, a worm wheel fixed on the shaft, a worm meshing with the worm wheel, a worm shaft, a support in which the worm shaft is journaled, the support being mounted loosely on the driven shaft only, means for driving the worm, and means restraining the worm from angular movement about the driven shaft while leaving it continually free for adjustive movement due to wear of the shaft journal bearing, or to non-alinement in the driven machine, and a floating driving shaft for the worm shaft and a connection permitting longitudinal and angular movement between the worm shaft and said floating shaft but compelling them to rotate together.

In testimony whereof, I have signed my name to this specification.

RALPH C. SEYMOUR.